United States Patent [19]

Lewis et al.

[11] Patent Number: 4,645,039
[45] Date of Patent: Feb. 24, 1987

[54] PARKING BRAKE FOR OFF-HIGHWAY VEHICLES

[75] Inventors: Billy M. Lewis, Joplin, Mo.; Walter I. Myers, Tulsa, Okla.

[73] Assignee: Wiseda Ltd., Cardin, Okla.

[21] Appl. No.: 746,719

[22] Filed: Jun. 20, 1985

[51] Int. Cl.4 ............................................. F16D 55/22
[52] U.S. Cl. .................. 188/72.3; 188/72.4; 188/170; 192/91 R
[58] Field of Search ................... 188/72.3, 71.2, 170, 188/71.5, 72.4, 72.5, 366, 367, 18 A, 216; 303/71, 6 M; 192/89 B, 91 R, 91 A, 70.2, 70.27; 92/63, 62, 130 A, 130 B, 18

[56] References Cited

U.S. PATENT DOCUMENTS

| | | | |
|---|---|---|---|
| 2,775,319 | 12/1956 | Friedman | 188/170 |
| 3,831,718 | 8/1974 | Muller et al. | 188/170 |
| 3,893,556 | 7/1975 | Lech, Jr. | 188/170 X |
| 4,014,414 | 3/1977 | Yamamoto et al. | 92/18 X |
| 4,078,637 | 3/1978 | Hanks | 188/170 |
| 4,128,145 | 12/1978 | Euler | 188/170 X |
| 4,129,204 | 12/1978 | Hedgcock | 188/170 X |

Primary Examiner—Douglas C. Butler

[57] ABSTRACT

A parking brake assembly for large off-highway vehicles and comprising a housing adapted to be installed around the rotatable drive shaft of a wheel motor, a plurality of clutch plates disposed within the housing and engaged with the drive shaft for rotation or non-rotation simultaneously therewith, a piston assembly reciprocally disposed within the housing and having a normal position of pressure engagement with the clutch plate whereby the brake assembly is normally in a braking engagement with the drive shaft, an annular chamber is provided in the housing and in communication with the piston for receiving a pressure fluid therein and exhausting the pressure fluid therefrom, the application of a pressure fluid into the chamber causing the piston to move into a non-braking pressure position with respect to the clutch plates and the release of fluid pressure from the chamber permitting the piston to return to the braking pressure engagement with the clutch plates.

20 Claims, 2 Drawing Figures

PARKING BRAKE FOR OFF-HIGHWAY VEHICLES

BACKGROUND OF THE INVENTION

1. Field of the Invention

This invention relates to improvements in braking apparatus and more particularly, but not by way of limitation, to a parking brake for large off-highway vehicles.

2. Description of the Prior Art

Exceedingly large off-highway vehicles are in widespread use today, particularly in the mining industry wherein it is advantageous to haul great quanitities of ore in a single transport vehicle. Many of these vehicles are powered by wheel mounted electric motors, and the great weight of the vehicle coupled with the great size thereof creates problems in the braking apparatus that may not be present in vehicles of a more conventional size. In addition, it is extremely important that the braking of these vehicles be efficient since any loss of braking power can result in great damage to both the vehicle and any personnel which might be in the vicinity of the vehicle. Of course, it is common practice to provide parking brakes for these vehicles in addition to the other braking apparatus on the vehicle. There are many parking devices which have been developed for off-highway vehicles such as shown in the Friedman patent No. 2,775,319, issued Dec. 25, 1956, and entitled "Spring Applied Wheel Brake;" Lech, Jr. et al U.S. Pat. No. 3,893,556, issued July 8, 1975, and entitled "Fluid Released Clutch;" Yamamoto et al U.S. Pat. No. 4,014,414, issued Mar. 29 1977, and entitled "Power Parking Failsafe Disc Brake;" Hanks U.S. Pat. No. 4,078,637, issued Mar. 14, 1978, and entitled "Fluid Disengaged and Spring Urged Brake;" and the Hedgcock U.S. Pat. No. 4,129,204, issued Dec. 12, 1978, and entitled "Spring Operated Clutch with Small and Large Bolts." One particular disadvantage of the presently available parking brakes for large off-highway vehicles, such as shown in the aforementioned patents, is the fact that an operator of the vehicle may inadvertently forget to "set" the parking brake when he leaves the vehicle. This is a particular problem in large vehicles of this type because of the overall weight involved. For example, when one of these vehicles has been parked at the edge of a precipice, such as the edge of an open pit mining operation, the omission of the setting of the parking brake may result in the accidental movement of the vehicle downwardly over the edge of the precipice, not only causing great damage to the vehicle itself, but also creating a hazard for any operating personnel in the vicinity of the accident.

SUMMARY OF THE INVENTION

The present invention contemplates a novel parking brake for large off-highway vehicles and which has been particularly designed and constructed for overcoming the foregoing disadvantages. The novel parking brake apparatus comprises a cylindrical housing bolted or otherwise secured directly to the frame of the usual motorized wheel drive, such as a General Electric wheel motor, but not limited thereto, and encases the usual splined drive shaft of the wheel motor. Clutch means is provided in the housing and in splined connection with the drive shaft for rotation or non-rotation simultaneously therewith. Piston means is disposed outboard of the clutch means and encased within a second housing which is secured to the first housing. An annular chamber is provided in the second housing and open to one face of the piston head of the piston means. Inlet port means is provided in the second housing and in communication with the annular chamber for the alternate application to and withdrawl of fluid from the annular chamber. Spring means, such as Belleville washers, but not limited thereto, are disposed within the second housing and constantly urges the piston means in a direction toward the clutch members for providing a normal engaged position for the clutch. The application of fluid into the annular chamber acts against the force of the spring means for moving the piston in a direction away from the clutch means for releasing the engagement therebetween. When the piston is engaged with the clutch means, the clutch securely retains the splined drive shaft from rotation, thus providing an efficient braking action for the vehicle. When the piston means releases the engagement of the clutch means, the splined drive shaft is free to rotate, thus the braking action is released. The novel parking brake is simple and efficient in operation and economical and durable in construction.

DETAILED DESCRIPTION OF THE PREFERRED EMBODIMENT

Figure 1:
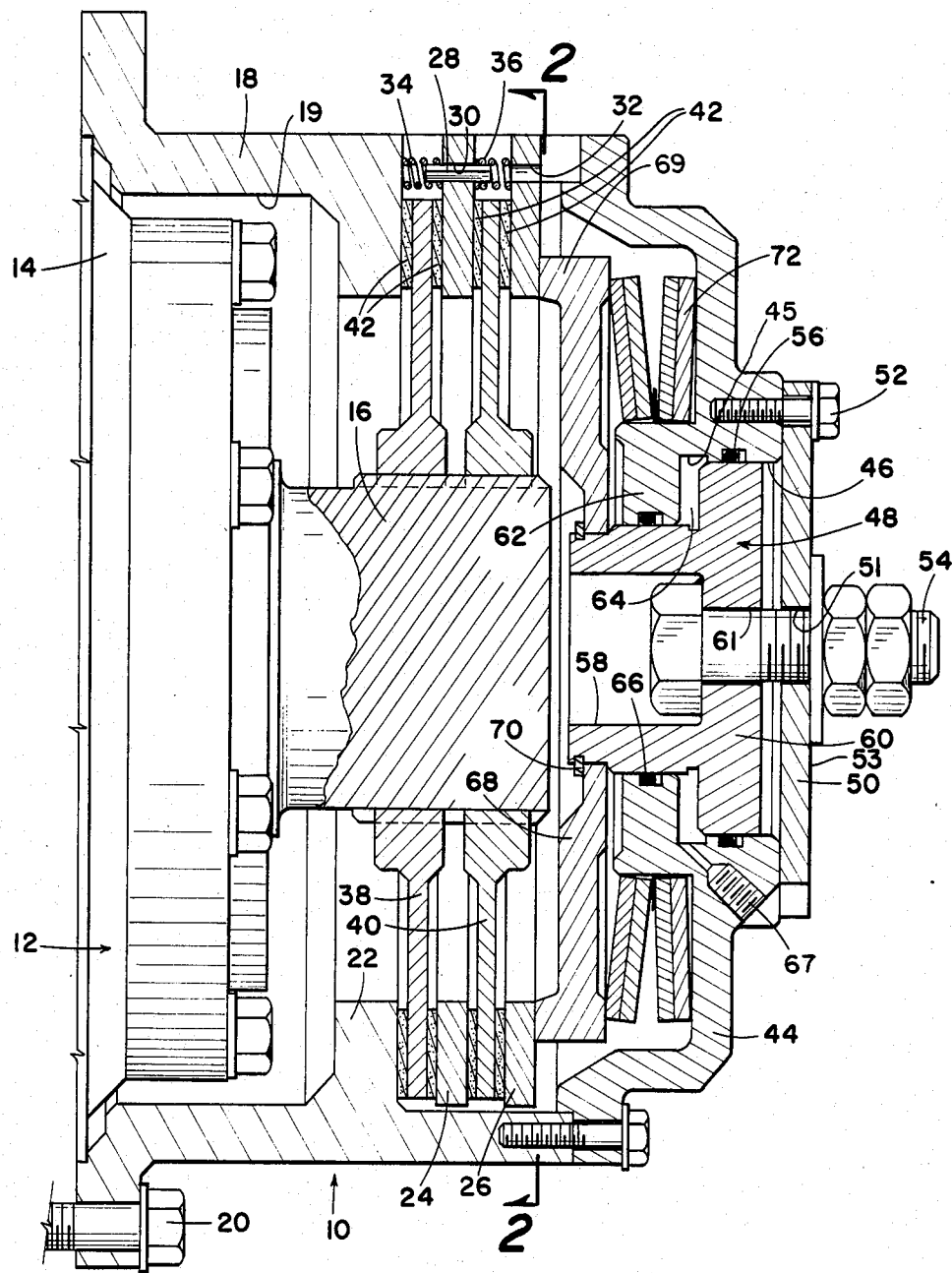
FIG. 1 is a sectional elevational view of a parking brake for large off-highway vehicles and which embodies the invention, with portions shown in elevation for purposes of illustration.
Figure 2:
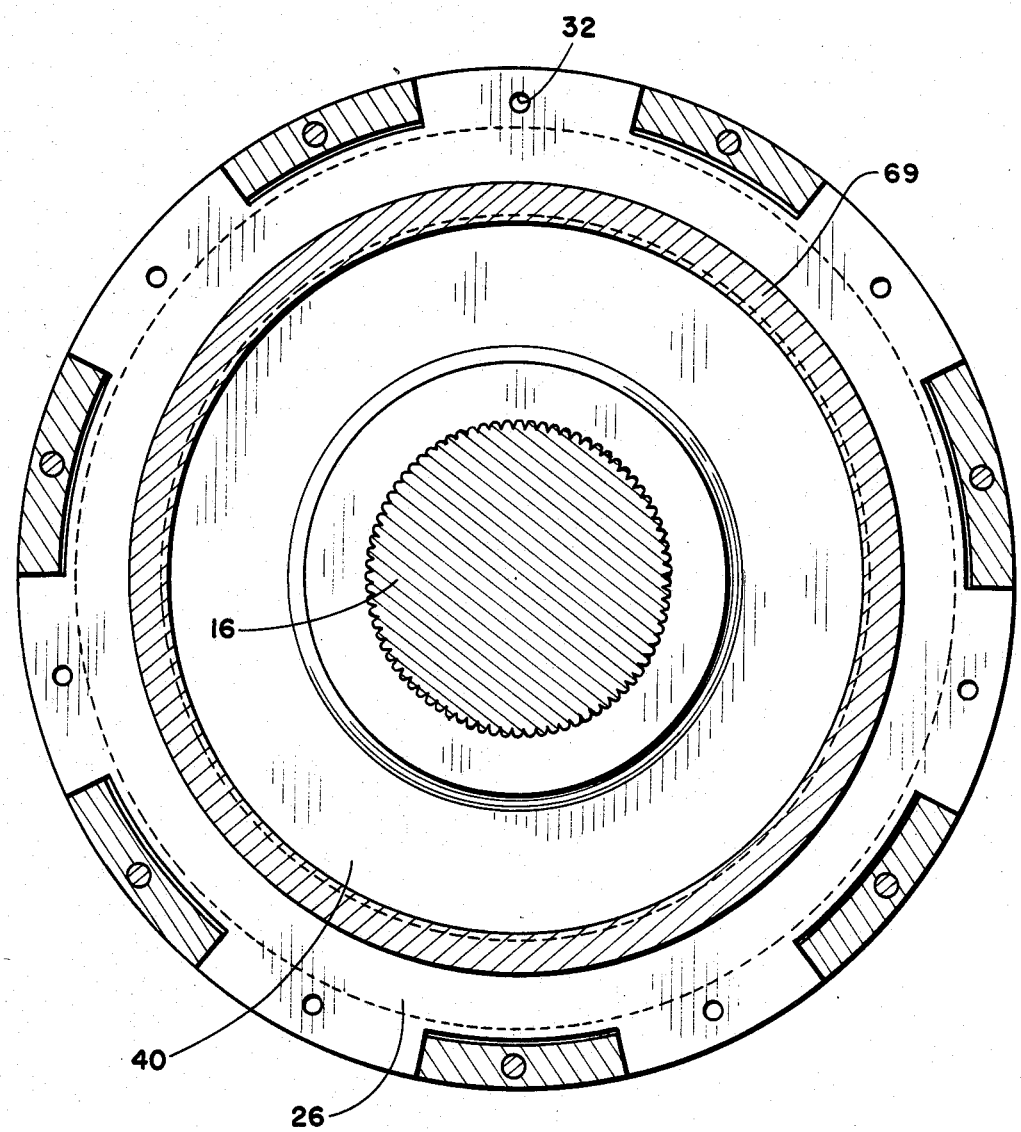
FIG. 2 is a view taken on line 2—2 of FIG. 1.

Referring to the drawings in detail, reference character 10 generally indicates a parking brake assembly adapted to be installed for use in connection with a suitable electric wheel motor 12, such as a General Electric wheel motor, or the like, but not limited thereto. The wheel motor 12 normally includes a frame 14 and a splined drive shaft 16 extending axially outwardly from the outboard side of the wheel motor 12. The brake assembly 10 comprises a flanged housing 18 secured to the wheel motor frame in any suitable manner, such as by a plurality of circumferentially spaced bolts 20, and is preferably concentrically disposed around the outer periphery of the shaft 16. Thus, as shown in FIG. 1, housing 18 defines a cavity therein which receives shaft 16. An annular shoulder 22 is provided on the inner periphery of the housing 18 and is spaced radially outwardly from the shaft 16. A pair of floating annular rings 24 and 26 are disposed within the housing 18 and spaced outboard of the shoulder 22. The rings 24 and 26 are each tied to the housing 18 and thus to the wheel motor frame 14 in any suitable manner such as by shaft or pin means 28 (FIG. 1) slidably disposed in aligned bores 30 and 32 provided in the rings 24 and 26 and radially spaced from shaft 16. Suitable helical spring means 34 is disposed around the outer periphery of the shaft 28 and interposed between the annular shoulder 22 and the ring 24 for constantly urging the ring 24 in a direction away from the shoulder 22. A second helical spring means 36 is similarly disposed around the shaft 28 and interposed between the rings 24 and 26 for constantly urging the plate 26 in a direction away from the plate 24.

A pair of substantially identical clutch member or plates 38 and 40 are disposed within the housing 18. The inner periphery of each clutch member 38 and 40 is in engagement with the splined shaft 16 for rotation and/or non-rotation simultaneously therewith. The outer periphery of the clutch member 38 is interposed between the shoulder 22 and the ring 24, and the outer periphery of the clutch 40 is interposed between the rings 24 and 26. Of course, suitable clutch pad means 42 is preferably provided for the opposed faces of each clutch member 38 and 40 for engagement by the shoulder 22 and rings 24 and 26 during a clutching engagement therebetween as is well known and as will be hereinafter set forth.

A second flanged housing 44 is secured to the outer end of the first housing 18, and is provided with a cavity 45 in communication with cavity 19 in housing 18 and having a central bore 46 for slidably receiving a piston means 48 therein. Thus, cavity 45 provides a piston receiving portion. It will be seen in FIG. 1 that piston means 48 is positioned outwardly from shaft 16 and is substantially coaxial therewith. A cover member 50 is removably secured to the housing 44 in any suitable manner, such as by a plurality of circumferentially spaced bolts 52 and closes the outer open end of the bore 46. The piston means 48 may be slidably or reciprocally secured to the cover 50 in any suitable manner, such as bolt and lock nut means 54. The bolt extends through hole 51 in the cover, and a nut is positioned adjacent outer surface 53 of the cover. Piston means 48 is axially movable toward and away from shaft 16. It will be seen that bolt and lock nut means 54 provides a means limiting movement of piston means 48 toward shaft 16. Of course, suitable sealing means 56 is preferably interposed between the piston and the inner periphery of the bore 46 for precluding leakage of fluid therebetween.

The piston means 48 as shown herein comprises a sleeve member 58 having the inner end thereof open and the outer end thereof closed. The closed end is provided with an outwardly directed circumferential flange 60 providing a piston head for the piston means 46. The bolt means 54 extends slidably through a bore 61 provided in the closed end of the sleeve 58. An inwardly directed annular flange 62 is provided on the inner periphery of the bore 46 for slidably receiving the sleeve 58 therethrough and for providing an annular chamber 64 around the sleeve 58 and between the head 60 and the flange 62. Of course, suitable sealing means 66 may be interposed between the sleeve 58 and the inner periphery of the flange 62 for precluding leakage of fluid therebetween. An inlet-outlet port means 67 is provided in the housing 44 to provide communication between the exterior of the housing 44 and the chamber 64. The port 67 is adapted to be connected with any suitable source or supply of fluid whereby fluid pressure may be selectively admitted to and relieved from the chamber 64 for a purpose as will be hereinafter set forth.

An annular flange 68 is secured around the outer periphery of the sleeve 58 in any suitable manner, such as by lock washer means 70 and is preferably disposed in the proximity of the open inner end thereof. The flange 68 is provided with an axially outwardly extending circumferential shoulder 69 around the outer periphery thereof which is in abutting engagement with the outward face of the annular ring 26. The reciprocation of the piston 48 within the inner periphery of the flange 62 moves the annular flange 68 in directions toward and away from the housing 18 for altering the pressure of the rings 24 and 26 against the clutch members 38 and 40. Of course, when the piston 48 is in the innermost position thereof, the clutch plates 38 and 40 will be tightly engaged between the rings 24 and 26 and the shoulder 22 whereby the splined drive shaft 16 will be held stationary or held against rotation due to the stationary connection of the housing 18 with the motor frame 14. When the piston 48 is in its outer position the pressure of the rings 24 and 26 and shoulder 22 against the clutch plates 38 and 40 will be lessened or relieved, thus freeing the shaft 16 for free rotation about its own longitudinal axis. Suitable annular spring means 72 preferably of the Belleville spring type, but not limited thereto, is disposed around the outer periphery of the flange 62 and interposed between the flange 68 and the housing 44. The spring means 72 constantly urges the flange 68 in a direction toward the ring 26 to provide a normal braking pressure engagement with the clutch plates 38 and 40. Thus, the parking brake 10 is normally in a braking position.

In use, the parking brake assembly 10 may be installed or secured around the drive shaft 16 of substantially any desired wheel motor 12. As hereinbefore set forth, the brake assembly 10 is normally in a braking or engaged position for precluding rotation of the axle or shaft 16. When the braking engagement of the assembly 10 is to be released, fluid pressure may be applied to or directed into the chamber 64 in any suitable or well known manner. For example, the operator of the vehicle (not shown) upon which the brake assembly 10 has been installed is usually provided with hand or foot actuated means (not shown) in the cab (not shown) of the vehicle which controls the supply of pressure fluid to many elements of the vehicle, one of such controls being to control the supply of and withdrawal of fluid to the port means 67.

When the fluid pressure admitted into the chamber 64 exceeds the force of the spring means 72, the piston head 60 will be moved in a direction away from the ring 26. The flange means 68, being tied directly to the piston 48, will be simultaneously moved away from the braking engagement with the ring 26. The pressure against the clutch plates 38 and 40 will thus be relieved, and the shaft 16 will be free to rotate about its own longitudinal axis. When the braking pressure is to be resumed, the pressure fluid present in the chamber 64 may be released or removed therefrom through the port 67, whereupon the spring means 72 will return the flange 68 into the pressure engagement with the ring 26. Since the normal position for the brake assembly 10 is the braking engaged position, accidental omission of the application of the parking brake is essentially eliminated.

From the foregoing, it will be apparent that the present invention provides a novel parking brake assembly for large off-highway vehicles wherein a piston means is normally retained in a braking engagement with the axle or drive shaft of a wheel motor, thus substantially precluding accidental omission of the setting of the parking brake. The application of pressure fluid into the interior of the assembly and behind the piston head releases the braking engagement of the assembly with the drive shaft for permitting free rotation of the drive shaft. The release of the fluid pressure automatically returns the brake assembly to the normal braking position therefor Whereas the present invention has been described in particular relation to the drawings attached hereto, it should be understood that other and further modifications, apart from those shown or suggested herein may be made within the spirit and scope of this invention.

What is claimed is:

1. A parking brake assembly for a large off-highway vehicle having at least one wheel powered by a wheel motor provided with rotatable shaft means extending axially outwardly therefrom, said assembly comprising:
   housing means encasing said shaft means and secured to said wheel motor for precluding rotation of said housing means;
   clutch means disposed within said housing means and operably connected with said shaft means, said clutch means having alternately disengaged and engaged positions for providing alternate rotation and non-rotation of said shaft means;
   reciprocable piston means disposed in said housing means outwardly from said shaft means and engagable with said clutch means for providing said alternate engaged and disengaged positions thereof;
   spring means cooperating between said housing means and said piston means for constantly urging said piston means in a direction toward said clutch means for providing said engaged position of said clutch means, corresponding to a normal position of said piston means, and thereby precluding rotation of said shaft means; and
   pressure chamber means in communication with said piston means for selectively applying pressure against said piston means for movement of said piston means in a direction away from said clutch means for providing selective disengagement of said clutch means, and thereby permitting free rotation of said shaft means.

2. The parking brake assembly of claim 1 wherein said piston means comprises:
   sleeve means reciprocably disposed within said housing means;
   piston head means provided at an outer end of said sleeve means and open to said pressure chamber means; and
   circumferentially outwardly extending flange means secured around an outer periphery of said sleeve means for engagement with said clutch means.

3. The parking brake assembly of claim 2 wherein said spring means is interposed between said circumferentially outwardly extending flange means and said housing means.

4. The parking brake assembly of claim 1 wherein said spring means comprises Belleville washers.

5. The parking brake assembly of claim 2 wherein said pressure chamber means comprises an annular chamber disposed around said outer periphery of said sleeve means at an underside of said piston head means and open for receiving and exhausting fluid pressure for providing selective reciprocation of said piston means.

6. The parking brake assembly of claim 1 wherein said clutch means comprises:
   an annular clutch plate having an inner periphery secured to an outer periphery of said shaft means for simultaneous rotation and non-rotation therewith; and
   floating annular ring means cooperating with said housing means for providing said engaged position of said clutch means.

7. The parking brake assembly of claim 1 wherein said floating annular ring means is one of a plurality of floating annular ring means, each defining a bore therethrough, and further comprising pin means slideably disposed through said bores.

8. The parking brake assembly of claim 7 further comprising:
   first spring means disposed around said pin means and between said housing means and an adjacent annular ring means; and
   second spring means disposed around said pin means and between adjacent annular ring means.

9. The parking brake assembly of claim 1 wherein said piston means is disposed outwardly from said shaft means of said wheel motor and coaxial therewith.

10. A parking brake apparatus for a wheel powered by a wheel motor having a drive shaft extending outwardly therefrom, said apparatus comprising:
    a housing assembly attachable to said wheel motor and defining a central cavity therein for receiving said shaft and having a shoulder in said cavity radially outwardly from said shaft;
    clutch means disposed in said cavity adjacent said shoulder and engaged with said shaft, including a floating ring disposed in said cavity and adjacent said clutch means;
    a piston reciprocably disposed in said cavity and outwardly spaced from said shaft, said piston being axially movable toward and away from said shaft;
    an annular flange attached to said piston for reciprocation therewith, said flange having a position engaged with said floating ring when said piston is moved toward said shaft and a position disengaged from said floating ring when said piston is moved away from said shaft;
    spring means for biasing said flange toward said floating ring and said piston toward said shaft; and
    fluid pressure means for moving said piston away from said shaft.

11. The apparatus of claim 10 wherein said clutch means further comprises:
    an annular clutch member attached to said shaft; and
    annular clutch pads disposed between said shoulder in said cavity and said clutch member and between said clutch member and said floating ring.

12. The apparatus of claim 10 further comprising means limiting movement of said piston toward said shaft.

13. The apparatus of claim 12 further comprising:
    a cover attached to said housing, said cover defining a hole therethrough; and
    wherein said means limiting movement comprises:
    a bolt engaged with said piston and extending through said hole in said cover; and
    a nut engaged with said bolt on an outer surface of said cover.

14. The apparatus of claim 10 further comprising sealing means between said piston and said housing.

15. The apparatus of claim 10 wherein said floating ring defines a bore therein spaced from said shaft, and further comprising:
    a pin disposed through said bore; and
    a spring disposed around said pin and between said floating ring and said shoulder in said housing.

16. A normally engaged parking brake for an off-highway vehicle wheel powered by a wheel motor having a drive shaft extending outwardly therefrom, said parking brake comprising:
    a housing assembly attachable to said motor and having a cavity therein such that said shaft of said motor extends into said cavity, said cavity having a piston receiving portion outwardly spaced from said shaft, said housing further having an annular shoulder therein;

a plurality of annular clutch plates disposed in said cavity and engaged with said shaft for rotation and non-rotation therewith, at least one of said clutch plates being adjacent and facing said shoulder in said housing;

a plurality of annular rings disposed in said cavity, one of said rings being adjacent an outward face of an outermost clutch plate and the other of said rings being disposed between adjacent clutch plates;

a plurality of annular clutch pads disposed in said cavity, one of said clutch pads being disposed between said shoulder and said one clutch plate and the other of said pads being disposed between said clutch plates and said rings adjacent to said clutch plates;

a piston reciprocably disposed in said piston receiving portion of said cavity, said piston comprising:

a sleeve member adjacent said shaft; and a piston head at an outer end of said sleeve member;

an annular flange attached to said sleeve member adjacent said shaft and adapted for reciprocation with said piston, said flange having an engaged position in which a shoulder thereon is engaged with said one annular ring and a disengaged position; and spring means for biasing said flange toward said engaged position.

17. The parking brake of claim 16 further comprising:
a cover attached to said housing and adjacent said piston head, said cover defining a hole therethrough;

a bolt extending axially outwardly from said piston head and through said hole in said cover; and a nut engaged with said bolt adjacent an outer surface of said cover.

18. The parking brake of claim 16 further comprising lock washer means for securing said flange to said sleeve member of said piston.

19. The parking brake of claim 16 further comprising sealing means between said piston and said housing.

20. The parking brake of claim 16 wherein said spring means is characterized by a plurality of Belleville washers.

* * * * *